United States Patent
Spiess et al.

(10) Patent No.: US 10,599,641 B2
(45) Date of Patent: Mar. 24, 2020

(54) SMART MATCH TUNING

(71) Applicant: SAP SE, Walldorf (DE)

(72) Inventors: Mark Spiess, La Crosse, WI (US); Jeffrey Woody, Onalaska, WI (US); Prasanthi Thatavarthy, Onalaska, WI (US); Ronald Dupey, Onalaska, WI (US)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 15/295,225

(22) Filed: Oct. 17, 2016

(65) Prior Publication Data

US 2018/0107709 A1    Apr. 19, 2018

(51) Int. Cl.
G06F 7/00       (2006.01)
G06F 16/242     (2019.01)
G06F 16/248     (2019.01)
G06F 16/2457    (2019.01)
G06F 16/9032    (2019.01)
G06F 17/00      (2019.01)

(52) U.S. Cl.
CPC ........ G06F 16/2428 (2019.01); G06F 16/248 (2019.01); G06F 16/24578 (2019.01); G06F 16/90328 (2019.01)

(58) Field of Classification Search
CPC ........... G06F 17/30398; G06F 17/3053; G06F 17/30554; G06F 17/30973; G06F 16/2428; G06F 16/24578; G06F 16/248; G06F 16/90328
See application file for complete search history.

(56) References Cited

U.S. PATENT DOCUMENTS

| | | | |
|---|---|---|---|
| 7,039,635 B1 * | 5/2006 | Morgan | G06F 17/30637 |
| 2002/0099701 A1 * | 7/2002 | Rippich | G06F 16/9038 |
| 2007/0168344 A1 * | 7/2007 | Brinson, Jr. | G06F 17/30648 |
| 2007/0255702 A1 * | 11/2007 | Orme | G06F 17/30696 |
| 2012/0011137 A1 * | 1/2012 | Sheha | G01C 21/3679 707/758 |

* cited by examiner

*Primary Examiner* — Kannan Shanmugasundaram
(74) *Attorney, Agent, or Firm* — Mintz Levin Cohn Ferris Glovsky and Popeo, P.C.

(57) ABSTRACT

Methods and systems are described for providing an editor for modifying predefined data match policies. The methods and systems can receive search requests including search criteria and obtain data records and a plurality of respective data match policies for the data records that correspond to the search criteria. The methods and systems can display a first set of data records and a second set of data records. The first set of data records may match the search criteria and the second set of data records may be identified as a partial match to one or more data match policies associated with the first set of data records. The methods and systems can receive a request to modify a data match policy corresponding to at least one of the second set of data records and generate and display a plurality of suggestions for executing the at least one request.

20 Claims, 8 Drawing Sheets

SMART MATCH TUNING

TECHNICAL FIELD

This description relates to configuration and generation of automated data policy suggestions using adjustable matching techniques.

BACKGROUND

Advanced data matching techniques may include the use of complex configurations of search options to perform a search for desired content in a collection of data. Configurable search options may include comparison rules that attempt to match particular data in one dataset to data in another data set. Because comparison rules can be different for each data set, search options for one data set may not translate for use with another data set.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for causing at least one processor to execute instructions recorded on a computer-readable medium, the method including initiating, at a user interface, execution of a software application implementing a plurality of processes, and displaying, in the user interface, an editor for modifying a plurality of predefined data match policies. The method may also include receiving, in the user interface, a search request. The search request may include search criteria. The method may also include obtaining a plurality of data records and a plurality of respective data match policies for the plurality of data records that correspond to the search criteria, in response to executing the search request. The method may also include displaying, in the user interface, and from the plurality of data records, a first set of data records and a second set of data records. The first set of data records may match the search criteria. The second set of data records may be identified as a partial match to one or more data match policies associated with the first set of data records. The method may also include receiving, in the user interface, at least one request to modify a data match policy corresponding to at least one of the second set of data records. The request may be based on the first set of data records. The method may also include generating and displaying, in the user interface, a plurality of suggestions for executing the at least one request. Other embodiments of this aspect include corresponding computer systems, apparatus, and computer programs recorded on one or more computer storage devices, each configured to perform the actions of the methods.

Implementations may include one or more of the following features. The method may also include generating and displaying a summary of a plurality of data changes that occur upon executing the plurality of suggestions associated with the at least one request. The data changes may include a list of the plurality of suggestions ranked according to a degree of extremeness. In some implementations, each suggestion corresponds to a display of statistics, graphical data, data impact analysis, and summary data associated with the request.

In some implementations, the plurality of predefined data match policies define data properties that constitute matches to other data properties. In some implementations, the plurality of suggestions are provided in ranked order based at least in part on a calculated impact of executing the at least one request and policy violation metrics associated with executing the at least one request.

In some implementations, the method may also include receiving a selection of at least one of the plurality of suggestions, executing the selected suggestion, and updating a data match policy associated with the at least one data record in the second set of data records. The method may also include receiving, from a software application executing on a client computing device, an additional service request to modify a data match policy corresponding to at least one of the second set of data records and determining a goal associated with the additional service request. The method may also include generating and displaying, in the user interface, a plurality of suggestions for carrying out the at least one request according to the goal. In some implementations, the goal includes matching at least one property of the first set of data records to at least one property of the second set of data records. In some implementations, the goal includes un-matching (e.g., mismatching) at least one property of the first set of data records with at least one property of the second set of data records. Implementations of the described techniques may include hardware, a method or process, or computer software on a computer-accessible medium.

In another general aspect, a computing system is described that includes a backend component, e.g., as a data server, or that includes a middleware component, e.g., an application server, or that includes a frontend component, e.g., a client computer having a graphical user interface or a web browser through which a user can interact with an implementation, or any combination of such backend, middleware, or frontend components. Components may be interconnected by any form or medium of digital data communication, (e.g., a communication network).

The system may be configured to modify a plurality of predefined data match policies. The system may include at least one memory including instructions on a computing device, and at least one processor on the computing device. The processor may be operably coupled to the at least one memory and is arranged and configured to execute the instructions that, when executed, cause the processor to implement operations that include initiating, at a user interface, execution of a software application implementing a plurality of processes, and displaying, in the user interface, an editor for modifying a plurality of predefined data match policies. The operations may also include receiving, in the user interface, a search request with search criteria. The operations may also include obtaining a plurality of data records and a plurality of respective data match policies for the plurality of data records that correspond to the search criteria, in response to executing the search request. The operations may additionally include displaying, in the user interface, and from the plurality of data records, a first set of data records and a second set of data records, the first set of data records matching the search criteria and the second set of data records being identified as a partial match to one or more data match policies associated with the first set of data records and receiving, in the user interface, at least one request to modify a data match policy corresponding to at least one of the second set of data records, the request being based on the first set of data records. The method may also include generating and displaying, in the user interface, a plurality of suggestions for executing the at least one request.

In some implementations, the system may also include operations of generating and displaying a summary of a plurality of data changes that occur upon executing the plurality of suggestions associated with the at least one request, the data changes including a list of the plurality of suggestions ranked according to a degree of extremeness. The plurality of suggestions may be provided in ranked order based at least in part on a calculated impact of executing the at least one request and policy violation metrics associated with executing the at least one request. In some implementations, each suggestion corresponds to a display of statistics, graphical data, data impact analysis, and summary data associated with the request.

The system may also include operations of receiving a selection of at least one of the plurality of suggestions, executing the selected suggestion, and updating a data match policy associated with the at least one data record in the second set of data records. The system may also include operations of receiving, from a software application executing on a client computing device, an additional service request to modify a data match policy corresponding to at least one of the second set of data records, determining a goal associated with the additional service request, and generating and displaying, in the user interface, a plurality of suggestions for carrying out the at least one request according to the goal.

In some implementations, the goal includes matching at least one property of the first set of data records to at least one property of the second set of data records or unmatching at least one property of the first set of data records with at least one property of the second set of data records.

Other embodiments of this aspect include corresponding computer systems, apparatus, and computer programs recorded on one or more computer storage devices, each configured to perform the actions of the methods. Implementations of the described techniques may include hardware, a method or process, or computer software on a computer-accessible medium.

According to another general aspect, a computer program product may be tangibly embodied on a computer-readable medium and may include executable code that, when executed, is configured to cause at least one data processing apparatus to perform the above operations.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
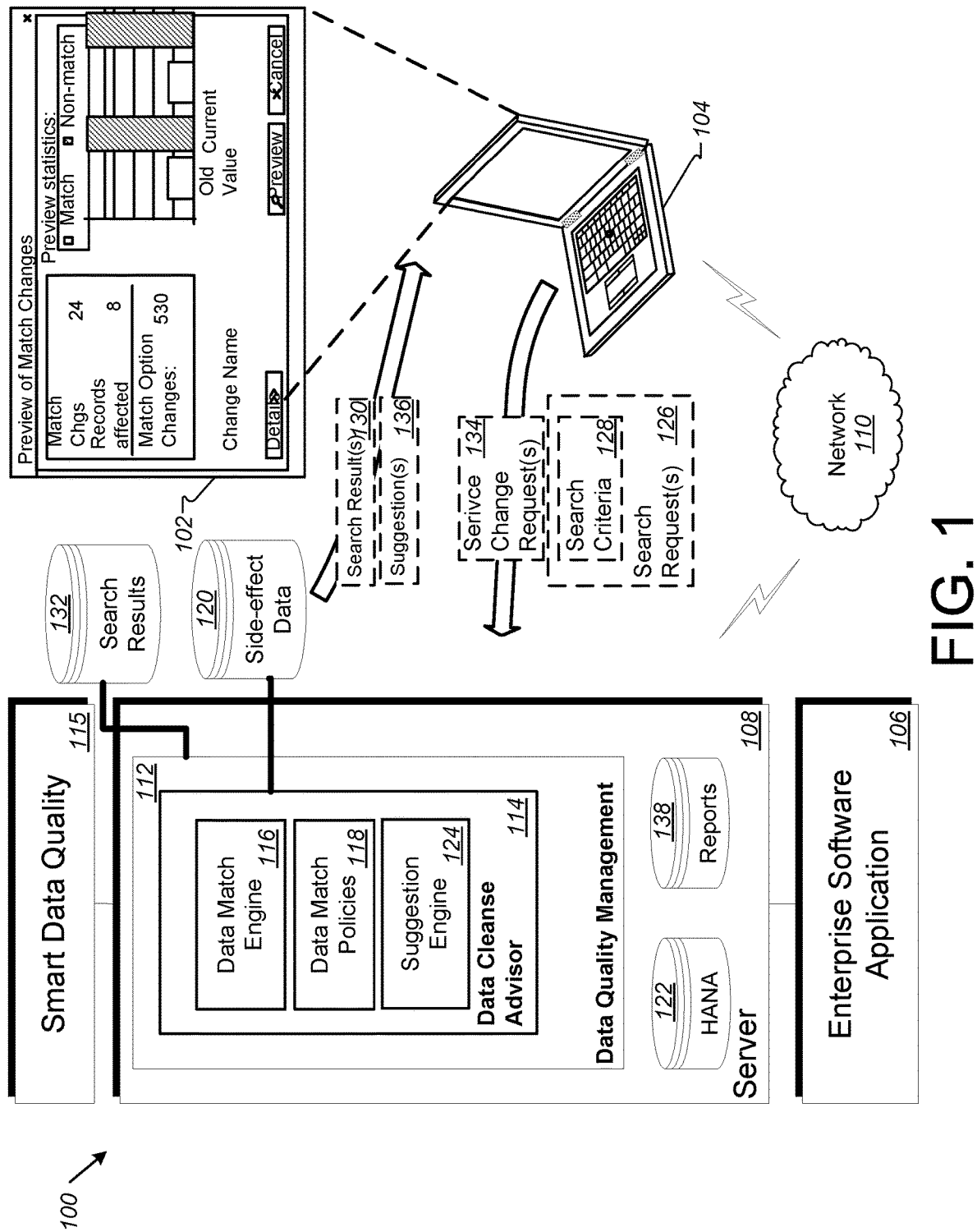
FIG. 1 is a block diagram of a system for generating and executing a user interface to provide data search and policy modification functionality using adjustable data matching techniques.

Search technologies that use data matching techniques to identify duplicates and/or similar data can be complex, and in some cases, may be perceived as difficult to use. It is not uncommon to have users iteratively adjust a combination of data match rules, configurations, and/or search options to find and organize specific data. However, a reliable configuration that works to search and combine data in one data set may not work at all to find and combine useful data in another data set. Moreover, obtaining optimal matching results for one data set configured according to a rule set may not indicate that such a rule set applies in the same manner to another data set.

The systems and methods described herein can reduce user-facing complexity in application software used for searching for, and interacting with, data in an enterprise resource computing system. In particular, the systems and methods can provide for automation of system-level policy modifications without receiving user requests to automate or modify specific policies.

In addition, the systems and methods described herein can provide a preview of proposed changes to policies before applying the changes. For example, suggestions can generated to indicate how system-level or user-requested changes may affect other data in an enterprise resource computing system. In particular, the suggestions can be provided to a user in a preview mode to indicate which changes are intended to be performed and how the changes may affect other data in the system. This can provide the advantage of indicating which data will be changed when a data operation or policy is implemented and/or changed without having the user manually differentiate between a before state and an after state of data pertaining to changes. The preview information can provide a method of tuning searches, data policies, data match policies, data storage, data presentation, and system interactions.

Users can access the systems and methods described herein to apply search criteria to find matching data for purposes of modifying, combining, adjusting, reporting or otherwise manipulating the data or policies associated with the data. Matching data using search criteria may include the configuration and use of any number of comparison rules. Comparison rules may be referred to as data match policies that define data properties that constitute matches to other data properties. A particular data set may include any number of data match policies pertaining to the data stored in the data set.

Within a software application, data match policies may be defined as preconfigured sections of eXtensible Markup Language (XML) code that may be internally assembled to identify matches based on user-selected policies. Data match policies can define dozens of search options and properties with respect to a variety of data sets. Typically, to use such search options, a user is first made aware of the options. However, providing too many data search options to the user can overwhelm the user, and can deter the user from retrieving useful information from a particular data set. The systems and methods described in this disclosure can generate and execute an editor (e.g., user interface) to provide enhanced data search functionality using adjustable matching techniques without exposing the user to all available search options and policies. In addition, the systems and methods described herein can enable modification of the data match policies associated with a particular data set to modify how such a data set is matched to other data. The editor can employ automated suggestions for modifying data match policies to enable adjustable matching techniques for finding matching data that may not otherwise be provided in response to a search request. The editor may mask (e.g., hide) particular search options, connections, policies, data, and/or functions while automatically adjusting data match policies and/or related data to provide meaningful search results and data organization to a requesting user. The meaningful search results can be used to modify aspects of stored data to ensure such data is provided (or configured not to be provided) in response to particular search requests carried out in the future.

FIG. 1 is a block diagram of a system 100 for generating and executing a user interface to provide data search and policy modification functionality using adjustable matching techniques. The system 100 may be configured to provide any number of user interfaces 102 associated with software executing on premise at a client device 104 or executing in a cloud computing environment. The client device 104 can display one or more user interfaces 102, which may be provided by an enterprise software application 106 and/or computing server 108, each executing as one or more server devices and connectable through network 110.

One example user interface 102 shown here includes a data preview of data match policy changes executed by data quality management application 112 accessing or running enterprise software application 106 and/or requesting data via computing server 108. The user can access user interface 102 to obtain, search, and modify data associated with the enterprise software application 106 and to edit and generate data match policies. Textual and graphical content displayed in user interface 102 may include data associated with and retrieved from a number of data sets accessible to enterprise software application 106 and/or server 108. In some implementations, the server 108 may represent a web server such as a HANA Cloud Platform (HCP) from SAP SE. In such an example, the user interface 102 may represent a front end of a web application deployed to a web server (e.g., server 108).

The user interface 102 may be a data match policy configuration editor that a user of system 100 can access to obtain, search, and modify data match policies. In particular, the user interface 102 can generate previews that detail how a particular data match policy change may affect other data (or policies) in a system. The user interface 102 can provide the preview as a number of suggested data changes (and data policy changes) in response to a request to better match particular data sets.

In an example in which user interface 102 is a data match policy configuration editor, a user can access interface 102 to define one or more data match policies for particular data sets or records. Each data match policy may define how data and data sets are organized for a particular organization. Data match policies can affect search results, operation using data, and/or reporting functions.

In one example implementation, system 100 includes one or more clients 104 that represent at least one customer installation (e.g., an on-demand or an on premise installation) or at least one user in a cloud-computing environment and one or more server systems 106 and 108. Clients 104 may be communicably coupled with server systems 106 and 108. In some implementations, one or more clients 104 may co-reside on a single server or system.

Referring to FIG. 1, a data quality management application 112 may be configured to ensure that the quality and consistency of user data is maintained. The data quality management application 112 may use data match policies to determine how data is to be matched and used together in any number of reports 138, data exchanges, data executions, and/or user requests. Data match policies can define what constitutes a match. For example, a user can request to match name data, or firm data, or address data—or a combination of such data and the system 100 can find similar or matching data using data match policies. In one example, the data quality management application 112 may recommend data match policies for a user based upon analysis of user data. Users can confirm that the analysis is proper and can confirm that components that make up the policies are accurate. If the user determines that such policies or analyses are improper, the software 112 can provide a mechanism to easily modify such policies and data using the user interfaces described herein.

The data quality management application 112 includes a data cleanse advisor 114. The data cleanse advisor 114 may be configured to abstract complexities involved in configuring data match policies. Many of the options in a robust data match engine, such as data match engine 116, are specific to certain data or certain business rules, and therefore, may not be frequently utilized. Yet when the scenario exists, the options may be used to meet business requirements, and thus, can be maintained in the system 100, but can remain hidden from a user of system 100. To maintain a simple user experience, many options are not exposed in the user interfaces described and depicted herein. However, the system 100 can utilize all available options without exposing the options and confusing users. The complexity of configuring data match polices can be eliminated without losing functionality when simplifying the user interface. In some implementations, the data cleanse advisor 114 and components within advisor 114 may be complimented or replaced by a smart data quality engine 115. The smart data quality engine 115 may perform any and all of the functions, operations, and methods described herein as being performed by the data cleanse advisor 114. In some implementations, the data cleanse advisor 114 is not used for the methods described herein and the smart data quality engine 115 is instead utilized to perform data quality operations.

In some implementations, the user interfaces described herein can provide efficiency for the user of system 100. For example, the system 100 can utilize suggestion engine 124 to quickly tune data match policies for a large amount of data without having the user manually determine policy choices. In particular, the system 100 can automatically encounter a number of data options, or combination of options, that should change in order to resolve undesired results, and present the user with an impact analysis not only on the observed records, but also on the entire data set. The user may not be privy to exact modifications in data match policies because they are not provided, but the user can still obtain desired data results based on the automation and logic imposed by the system 100.

In one example, data match policy 118 may include a number of XML lines. The following table illustrates variable ways to compare data for one particular data component (e.g., the organization name). In some implementations, the data match policies can be predefined by system 100. In some implementations, the data match policies can be defined, predefined, or modified by a user of the system, 100.

The data match policies may define data properties that constitute matches to other data properties.

In operation of system 100, a user can access user interface 102 to view matching data set content using the

TABLE 1

Example Data Match Policy Options
Data Match Policy Example

```
<COMPARE_MATCH_CRITERIA>
    <NAME>FIRM_NAME</NAME>
    <STANDARD_KEY_MATCH_OPTIONS>
<COMPARE_GIVEN_NAME1_TO_GIVEN_NAME2>NO</COMPARE_GIVEN_NAME1_TO_GIVEN_NAME2>
        <MATCH_ON_HYPHENATED_FAMILY_NAME>NO</MATCH_ON_HYPHENATED_FAMILY_NAME>
        <IGNORE_FAMILY_NAME_WHEN_FEMALE>NO</IGNORE_FAMILY_NAME_WHEN_FEMALE>
        <NUMBER_OF_NAMES_THAT_MUST_MATCH>ONE</NUMBER_OF_NAMES_THAT_MUST_MATCH>
    </STANDARD_KEY_MATCH_OPTIONS>
    <WEIGHTED_MATCH_SCORE>0</WEIGHTED_MATCH_SCORE>
    <CRITERIA_DEFINITION_GROUP>
        <CRITERIA_DEFINITION>
            <CRITERIA_NAME>FIRM</CRITERIA_NAME>
            <STANDARD_KEY_NAME>FIRM</STANDARD_KEY_NAME>
            <ONE_FIELD_BLANK_OPERATION>EVAL</ONE_FIELD_BLANK_OPERATION>
            <ONE_FIELD_BLANK_SCORE>0</ONE_FIELD_BLANK_SCORE>
            <BOTH_FIELDS_BLANK_OPERATION>EVAL</BOTH_FIELDS_BLANK_OPERATION>
            <BOTH_FIELDS_BLANK_SCORE>0</BOTH_FIELDS_BLANK_SCORE>
            <MATCH_SCORE>0</MATCH_SCORE>
            <NO_MATCH_SCORE>-1</NO_MATCH_SCORE>
            <CONTRIBUTION_TO_WEIGHTED_SCORE>0</CONTRIBUTION_TO_WEIGHTED_SCORE>
<USE_IN_WEIGHTED_SCORE_IF_GREATER_THAN>0</USE_IN_WEIGHTED_SCORE_IF_GREATER_THAN>
            <ZERO_WEIGHTED_SCORE_IF_LESS_OR_EQUAL>0</ZERO_WEIGHTED_SCORE_IF_LESS_OR_EQUAL>
            <ENABLE_INTERSCRIPT_MATCHING>NO</ENABLE_INTERSCRIPT_MATCHING>
            <COMPARE_ALGORITHM>WORD</COMPARE_ALGORITHM>
            <CHECK_FOR_TRANSPOSED_LETTERS>NO</CHECK_FOR_TRANSPOSED_LETTERS>
            <INITIALS_ADJUSTMENT_SCORE>90</INITIALS_ADJUSTMENT_SCORE>
            <SUBSTRING_ADJUSTMENT_SCORE>90</SUBSTRING_ADJUSTMENT_SCORE>
            <APPROX_SUBSTRING_ADJUSTMENT_SCORE>0</APPROX_SUBSTRING_ADJUSTMENT_SCORE>
            <ABBREVIATION_ADJUSTMENT_SCORE>80</ABBREVIATION_ADJUSTMENT_SCORE>
            <EXT_ABBREVIATION_ADJUSTMENT_SCORE>80</EXT_ABBREVIATION_ADJUSTMENT_SCORE>
            <NUMERIC_WORDS_MATCH_EXACTLY>ANY_POSITION</NUMERIC_WORDS_MATCH_EXACTLY>
            <COMPARE_FIELD_GROUP/>
        </CRITERIA_DEFINITION>
    </CRITERIA_DEFINITION_GROUP>
</COMPARE_MATCH_CRITERIA>
```

Some of the above options in Table 1 include yes or no options and some include enumerated lists of text or numeric values. Each option is offered because it has a unique role in obtaining desired matching results in a particular scenario. Some options may not be utilized when combined with other options because the combination may result in finding excessive false-positive records (i.e., records found to be matches that are not actually matches) or inadvertently missed matches (i.e., records that are matches but are not identified as matches).

The data match engine 116 can use internal knowledge (e.g., side-effect data 120, HANA data 122 or other data source) to compare and match particular data and data match policies. Side-effect data may include stored data that includes metrics, statistics, and change logs for particular data sets. Side-effect data can be used to revert back to prior data versions or policy versions based on previously stored settings. Side-effect data can also be used to provide suggestions of different variations of data match policies on system data. In some implementations, side-effect data represents a set of data tables in which the data match engine 116 can store statistics and information about the data matching process. This can prevent a user from having to generate extraneous columns in output/search result data records. In some implementations, the side-effect data 120 can replace lengthy post-process, user-driven, and custom data aggregations and analytics. The side-effect data can be joined with output data records to obtain information about individual records, information about data match groups, and information about the data sources being matched.

data cleanse advisor 114, for example. While accessing data match policies and data sets within advisor 114, the user can request to add a data record to another set of data records. The request to add the record may be received by advisor 114 as an indication to determine how the data record related to the request can be matched to records in the set of data records. In particular, the data cleanse advisor 114 can analyze data content, metadata, relationship data, side effect or statistical data, user data, or other system data to determine particular ways in which data records can be included as part of a specific set of data records. The suggestion engine 124 may perform such analyses when a user of the data cleansing advisor 114 is reviewing, in a user interface, particular match results and observing that one record is not part of a specific set of data records, but in fact, should have been part of the specific set of data records. In some implementations, to trigger such analyses, the user may make a determination, by inspection, and select the one record. The user can then drag the one record into an area of the user interface that lists the specific set of data records. The user can drag and release the one record into the specific set of data records. In response, the data cleanse advisor 114 can send a request including context data, the one record, and/or user data to the data match engine 116. The data match engine 116 can access any number of data match policies 118, which may be configured in a way that results in a no-match decision for the single record. The data match engine 116 can perform multiple search queries to analyze and match the one record to the specific records in the data set. The multiple attempts can include modifying properties in the data match policies 118 to find ways in which the particular data match policies for the one record can be modified (e.g., configured in a different way) to enable a match to occur between the one record and the specific set of records.

In one example, the analysis of the one record may occur in the context of the currently active data match policies in order to intelligently discover which options to modify. The analysis may include multiple searches and modifications to data and/or reconfiguring of data match policies to ensure that the one record matches the specific set of records, as in the example described above. The modifications that are determined to be valid options may be displayed to the user in the form of suggestions, written in simple language so that a user not trained in the technicalities of matching can understand the suggestions. The user can then select a suggestion to carry out changes detailed in the suggestion. In general, the suggestions include options that are valid suggestions for the particular data. While it may be possible to get two (or more) records to match by setting similarity thresholds very low, using such an low threshold can result in many false positives when running a full data source through the data match policies. Therefore, some of the possible modifications may not be displayed as selectable suggestions. Although the above example attempts to match a single record to multiple records, any number of records can be matched against any number of other records.

For each possible suggestion, the data accessed by the user may be re-run (e.g., re-executed) using reconfigured match policies in a particular suggestion. For example, the data match engine 116 may perform many iterations of executing combinations of modified data match policies. Therefore, when a list of suggestions is displayed in the user interface, each of the suggestions is also presented with an impact that the suggested modifications (in the suggestion) may have on the user's data. The impact may be displayed to the user by presenting a preview execution of the modifications to one or more data match policy in terms of the new matches and non-matches in the data records after the modifications are implemented. For example, the user may be presented with the single record and the other records now matching, along with any number of other records and groups of records that may be affected by such modifications. The ability to review, for each suggestion, the impact to other data may aid the user in deciding which of the suggestions may work well for particular data.

In some implementations, the system 100 can provide suggestions to modify data match policies in order to mismatch particular records from other records. For example, a user may wish to be more selective when combining records content under the same data match policy and can do so by accessing the data match engine 116 to automatically determine one or more options that can be modified in a data match policy in order to remove particular records from a data set. Similar to the display described above, a list of valid options may be displayed to the user in the form of suggestions and the actions to remove commonalities by changing data match policies can be performed.

In one non-limiting example, the server 108 may receive, from a software application executing on a client computing device 104, a search request 126 including search criteria 128 to retrieve particular data records. Retrieved data records may be provided to the user as search results 130 and stored in search results repository 132. Upon review of such records, the user may determine that particular records are not in the retrieved data records and may wish to search for records that the user perceives to be missing. In one example, the user may be provided with near match data records, in which case, the user can select one or more of the near match data records to add to the retrieved data records. In another example, the user may find that particular records in the retrieved data records may not belong in the set of records. In that case, the user may wish to remove the records from the set of records and may wish to modify enough data match policies or aspects associated with the inaccurate record such that the record is not populated in the retrieved records in response to the search query.

To add or remove one or more records from a list of records, the user may initiate a service request 134 (e.g., policy/service change request) to modify a data match policy corresponding to at least one data record. For example, the user may move a record from one location in the user interface to another location in the user interface to initiate a request to change a data match policy corresponding to the moved record. Alternatively, the move or indication to change a data match policy may correspond to modifying policies associated with data records at a location receiving a moved record. The request may trigger the data match engine 116 to begin determining user intent associated with the record move. For example, the data match engine 116 may attempt to determine a goal (e.g., intent) associated with the service request triggered by the move. For example, the goal may include matching at least one property of a first set of data records to at least one property of a second set of data records. Alternatively, the goal may include un-matching at least one property of the first set of data records with at least one property of the second set of data records. The goal can be deduced using contextual information including, but not limited to, user information, software accessed or open, shared policies between records, timestamps, etc.

The user may, for example, send a request to the server 108 to modify data or data policies associated with the at least one data record that she wishes to match other data records in her retrieved set of records. The data match engine 116 can execute multiple iterations of matching such data policies between the data records by changing any combination of options in order to find ways that match policies can be configured differently so that the same two records result in a match decision. Analysis of the two example records can be performed in the context of the current match policies in order to intelligently deduce which options to change with each iteration. The iterations may result in a number of plausible options and the data match engine 116 can provide particular suggestions from the options. The suggestions 136 for carrying out the at least one request according to the determined goal can be generated and displayed in a user interface for the user. In some implementations, data content from suggestions can be generated and stored as reports 138 for future use.

Referring again to FIG. 1, the computing server 108 also includes (or has access to) enterprise software application 106. The enterprise software application 106 represents computer software used to satisfy the needs of a business organization. Enterprise software application 106 generally includes a collection of computer programs (i.e., software applications and repositories) with common business applications, tools for modeling how an organization functions, and development tools for building applications unique to the organization. The enterprise software application 106 can be used in combination with server 108 to improve enterprise productivity and efficiency by providing data policy configuration, generation, and usage.

Services provided by the enterprise software application 106 may include business-oriented tools such as data model configuration management and data quality cleansing and management. Other services are possible including, but not limited to online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The server 108 in system 100 can be communicatively coupled to device 104. Device 104 can access server 108 and any associated software applications. Device 104 can be connected (wired or wirelessly) to system 106 and/or 108, which can provide business data, user interfaces, and other data for use and display. In some implementations, the client computing device 104 can execute one or more applications on the server 108 as a web application, for example.

At least some of the communications between the client 104 and servers 106 or 108 may be performed across or via network 110 (e.g., the Internet). In some implementations, system 100 may represent an example configuration of a system for establishing networks using networked applications built on a shared platform in a cloud computing environment. The client 104 and/or the servers 106 and 108 may be configured with development technology and hosted and managed services and applications built on top of an underlying platform technology. In one non-limiting example, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" is understood as an Enterprise Resource Planning (ERP) technology or in-memory database such as High Performance Analytic Appliance (HANA) platform.

In some implementations, any number of content servers and one or more computer-readable storage devices can communicate with the computing devices 104, 106, and 108 using network 110 to provide data content to client devices associated with system 100. In some implementations, the network 110 can be a public communications network (e.g., the Internet, cellular data network, dialup modems over a telephone network) or a private communications network (e.g., private LAN, leased lines). In some implementations, the computing devices 104 and/or 108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Example client devices may include a mobile device, an electronic tablet, a laptop, or other such electronic device that may be used to access content from server 108. Each client device can include one or more processors and one or more memory devices. The client devices can execute a client operating system and one or more client applications that can access, control, and/or display data on a display device included in each respective device. The computing server 108 may represent a server device. In general, the computing server 108 may include any number of repositories storing content and/or software modules that can search, generate, modify (e.g., edit), or execute data match policies and associated data including side-effect data 120 or other data.

In some implementations, the devices 104 and 106 can be laptop or desktop computers, smartphones, personal digital assistants, portable media players, tablet computers, gaming devices, or other appropriate computing devices that can communicate, using the network 110, with other computing devices or computer systems. Additional devices are possible and such devices may be configured to be substituted for one another.

Figure 2:
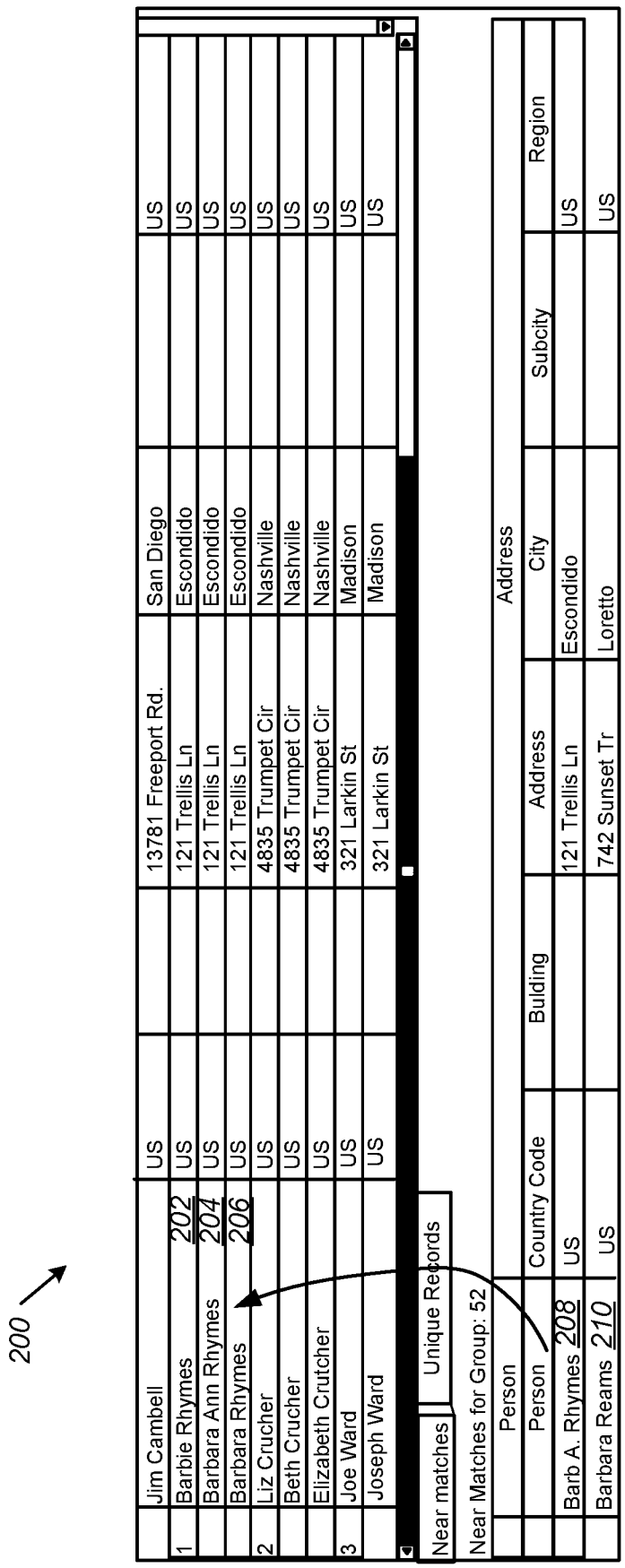
FIG. 2 is an example screenshot illustrating example data records in an editor for modifying data match policies.

FIG. 2 is an example screenshot 200 illustrating example data records in an editor for modifying data match policies. The editor may be generated in a user interface that is executed by system 100. The user interface shown in screenshot 200 may be generated by server 108, and more particularly may be provided and interfaced by data cleanse advisor 114 and data match engine 116.

A user can access the editor in client device 104, for example. In response, the system 100 can initiate execution of a software application (e.g. pertaining to user interface 102, for example) to display the editor for modifying predefined data match policies without actually selecting and viewing such policies in full. The editor can provide a manual mode to select and move data records. The editor may also support an automated mode to modify data match policy records in response to receiving manual data requests or movements from a user. For example, the user may send a search request with search criteria to a server, such as server 108. The server 108 may execute the search request and obtain data records matching portions of the search criteria in the search request. The server 108 can then display the obtained data records that match portions of the search criteria in a user interface, such as interface 102. In one example, the records may be presented as match groups. In this example, a first set of records represents a first match group while a second set of records represent a second match group. The first set of records may be indicated as matching the search criteria. The second set of records may be indicated as partially matching the search criteria. For example, the first set of data records includes information about "Barbie Rhymes" 202, "Barbara Ann Rhymes" 204 and "Barbara Rhymes" 206.

The second set of data records is displayed in FIG. 2 below the first set of records. The second set of records are indicated as near match or partial match records that may match one or more data match policies corresponding to the matched records. The near match records include "Barb A. Rhymes" 208 and "Barb Reams" 210.

The user may be reviewing the records 202-210 in the editor and can determine that a near match record should, in fact, be included in the matched, first set of records. For example, record 208 includes the same address as records 202, 204, and 206, which may indicate that the same match polices should be applied to data record 208 as is applied to records 204 and 206. Although a system process indicated that record 208 did not match records 202-206, the user can provide, in the editor, a request to modify a data match policy corresponding to data record 208 in order to make a partially matched record a fully matched record. For example, the user can select record 208 and drag the record into the match area with records 202-206. The system 100 can then generate and display, to the user in the editor, suggestions for carrying out request. For example, the system 100 can provide suggestions for how to make record 208 match data policies associated with records 202-206. The system 100 may also provide a number of consequences that may occur to system data should the user wish to carry out the suggested changes associated with the request.

Once the user selects, drags, and drops record 208 into the area with records 202-206, the match/tuning process described throughout this disclosure may be triggered. In the example in FIG. 2, the process identifies four records 202-208 and uses a property that identifies the first three records 202-206 as matching, a property that identifies the fourth record 208 as not matching, a match engine configuration that generated the results of the record matching, the HANA database 122 to retrieve task execution identification information, and the user request indicating an action to make the records 202-208 match particular data match policies. In some implementations, the user drag and drop action triggers a smart match tuning algorithm to adjust configuration settings based on the user request to make particular data records match from a data policy standpoint.

In some implementations, the process may use the HANA task execution identification information in database 122 to query side-effect data 120 generated by any previous execution of a match operation corresponding to the records shown in FIG. 2. An analysis can be performed on the match policies selected, the match settings used by the last execution, the trail of match settings used in the event the task was executed multiple times, and the results that the match engine generated with each task execution.

The process can identify where the previously used settings failed to identify the fourth record 208 to each of the three matching records 202-206 (i.e., at what step in the process the record was determined to be a non-matching record to each). The process may also analyze the data to specifically look for scenarios that commonly result in actual matching records resulting in a non-match decision, such as different writing scripts, different languages, phonetic spelling variations, different fielding of data, and different ways of representing data.

Figure 3:
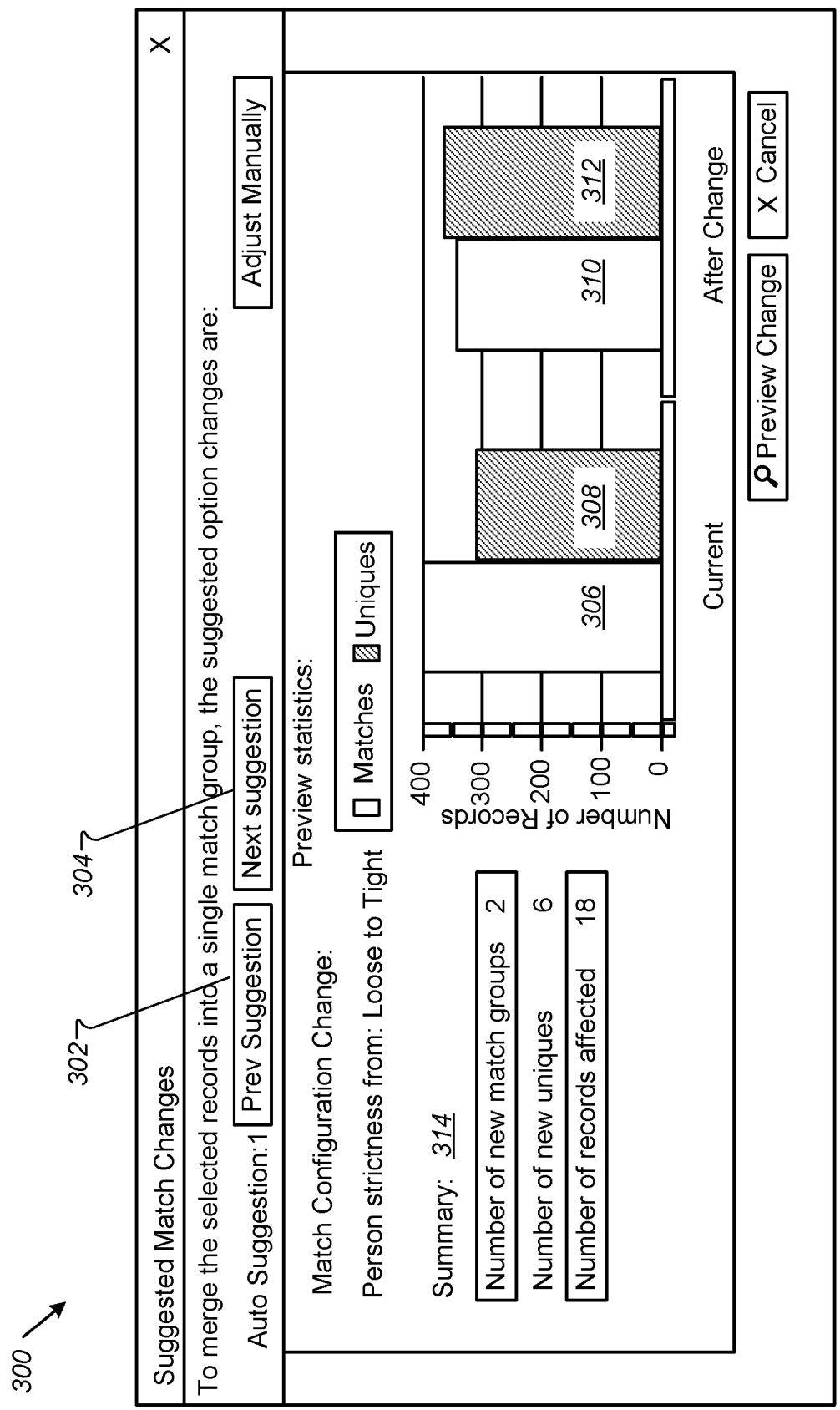
FIG. 3 is an example screenshot illustrating example suggestions for modifying data match policies associated with data.

FIG. 3 is an example screenshot 300 illustrating example suggestions for modifying data match policies associated with data. The user interface shown in screenshot 300 may be generated by server 108, and more particularly may be provided and interfaced by data cleanse advisor 114 and data match engine 116. The suggestions described herein may include options that suggest (data match) policy changes, data changes, metadata changes, or other data related changes based on a request received from a user to attempt to automatically match data (data policies) associated with one particular record to a set of data (or data policies) associated with another set of records.

In the depicted example screenshot 300, controls are shown to move through a number of suggestions. For example a previous suggestion control 302 may be used to scroll backward through suggestions while a next suggestion control 304 may be used to scroll forward through suggestions.

Each suggestion may include, or be associated with, a user interface that may textually or graphically show a before statistics illustrating the data before a change is implemented and an after statistics illustrating the data after the change is implemented. In this example, the number of records that match before the user request (e.g., data change) is carried out include 400 records shown at bar 306. The number of records that do not match (e.g., unique records) before the user request is carried out include about 300 records shown at bar 308. Similarly, a number of records that match or that do not match after the user request is carried out are shown at bars 310 and 312, respectively. In general, each suggestion is presented to the user one at a time, together with statistics that show scenarios with respect to what the impact would be if that particular suggestion were accepted.

The data match engine 116 may present textual and graphical data and statistics about the matching process and how particular data records (e.g., match groups) are identified. For example, engine 116 can determine that a number of new match groups are added and that a number of data records are affected. In this example, a summary 314 is shown to the user in a user interface populated by engine 116. In particular, engine 116 can access side-effect data 120 and other system data to enable integrating applications to develop match review user interfaces that make a user review process efficient. As the user reviews the results, the user can determine whether particular data would benefit from being tightened or loosened in order to generate useful and accurate results. For example, slide bars, menus, or other data change controls may be provided in the user interface to allow the user to modify strictness of data rules. Such options provide the user easy-to-use settings that, when adjusted, result in multiple lower-level options being adjusted in the data match engine 116, and the match process can be executed again with the new settings to provide updated results.

In some implementations, after the analysis is completed, a table can be referenced and or provided to the user. The table may include mappings of failure reasons to options that can be modified to obtain a desired user-requested action. In the example of the four records 202-208 shown in FIG. 2, the data match engine 116 can process the four records 202-208 through an internal form of a particular match configuration that is adjusted in each of the multiple ways associated with each respective data record. In each of these paths, the engine 116 may first adjust the data match policy by the least amount possible to see if the desired action (in this case a match decision) is obtained, and if not then the engine 116 can adjust the policy again and try again. The data match engine 116 may execute modifications to the policy until the desired action is reached. The setting that results in the desired action being reached can be stored. In addition, a setting for a degree of extremeness can be stored. This process may be performed for each potential solution, where the internally adjusted settings and the degree of extremeness are stored. Each of the successful solutions can be ranked by degree of extremeness and penalties in the order of least extreme data modification to most extreme data modification. The resulting list may then be presented to the user in the form of graphical and textual suggestions in the user interfaces, as depicted and described throughout this disclosure.

In some implementations, the degree of extremeness is computed by data cleanse advisor 114. The ordered list of suggestions presented to the user may be ordered from the least extreme data changes (presented first) so that failures are fixed in a way that there is the least amount of negative results associated with the data change. If the user finds that one of the suggestions fixes a particular failure that the user observed and other records affected by the change are positive differences, then the suggestion can be accepted and the change can be stored in the match configuration (e.g., data match policy). However, if the suggestion fixes the observed failure, but results in negative differences to the data, the user may reject the suggestion and review the results of the next suggestion.

In some implementations, the suggestions engine 124 can evaluate data in a truth table using a configuration for each of the potential solutions. This truth table is an option that integrating applications can use to store information about each of the committed user-determined match/no-match decisions based on actions that the user makes in the user interface 300, for example. If any of this truth data violates the settings in the internally adjusted configuration, that solution may be flagged as not conforming to user-determined decisions. While the solution is still presented as one of the potential options, it is both penalized in its ranking and flagged as potentially non-conforming.

Each suggestion that is presented in a user interface successfully accomplished the goal that in this case is to place the fourth record 208 into the match group for records 202-206. However, when matching large volumes of data it may be probable that the option(s) configured differently will have an effect on other records. Some of those differences will be useful differences, because it may be likely that the reason that prevented the fourth record 208 from matching the other records 202-206 is the same reason that prevented other records from matching. However, some of the differences can result in undesired data changes. Therefore, the integrating application using the data cleanse advisor 114 can include a way for the user to view the impact of a change, both in the form of statistics and in the form of providing access to a view the affected data, as shown in FIGS. 2-6. Such data may be stored in side-effect data 120 in table form that applications can access and present to the user.

When an integrating application presents an impact of a suggested change associated with a user request, the data match engine 116 can re-execute a task with the suggested on the entire data set associated with the request because the impact results will then be exact. However, if the volume of data is large, running a match task on the entire data set may take longer than desired. In this scenario, an alternative is to enable the application to call a predictive analysis feature to analyze information that the previous full execution may have stored as side-effect data. The application can execute and return predictive results even though the application only actually processes the four received records 202-208. In this case, the impact of each suggestion can show the statistical impact based on predictive analysis, but may not provide access to review affected data.

In the example described in FIG. 2 above, the requested action was to make a match decision on records that had received a no-match decision. However, the methods described herein may also work on the opposite action. The user may see a match group during a review process that contains records that the user deems should not match. In this case, the integrating application can be created such that the user selects the record that should not be part of the match group, and drags the record out of the group and into a non-matching records pane. This action may trigger the data match policy tuning process by sending much of the same properties as in the FIG. 2 example, but with the action being the goal of making the records not include matching data policies.

Figure 4:
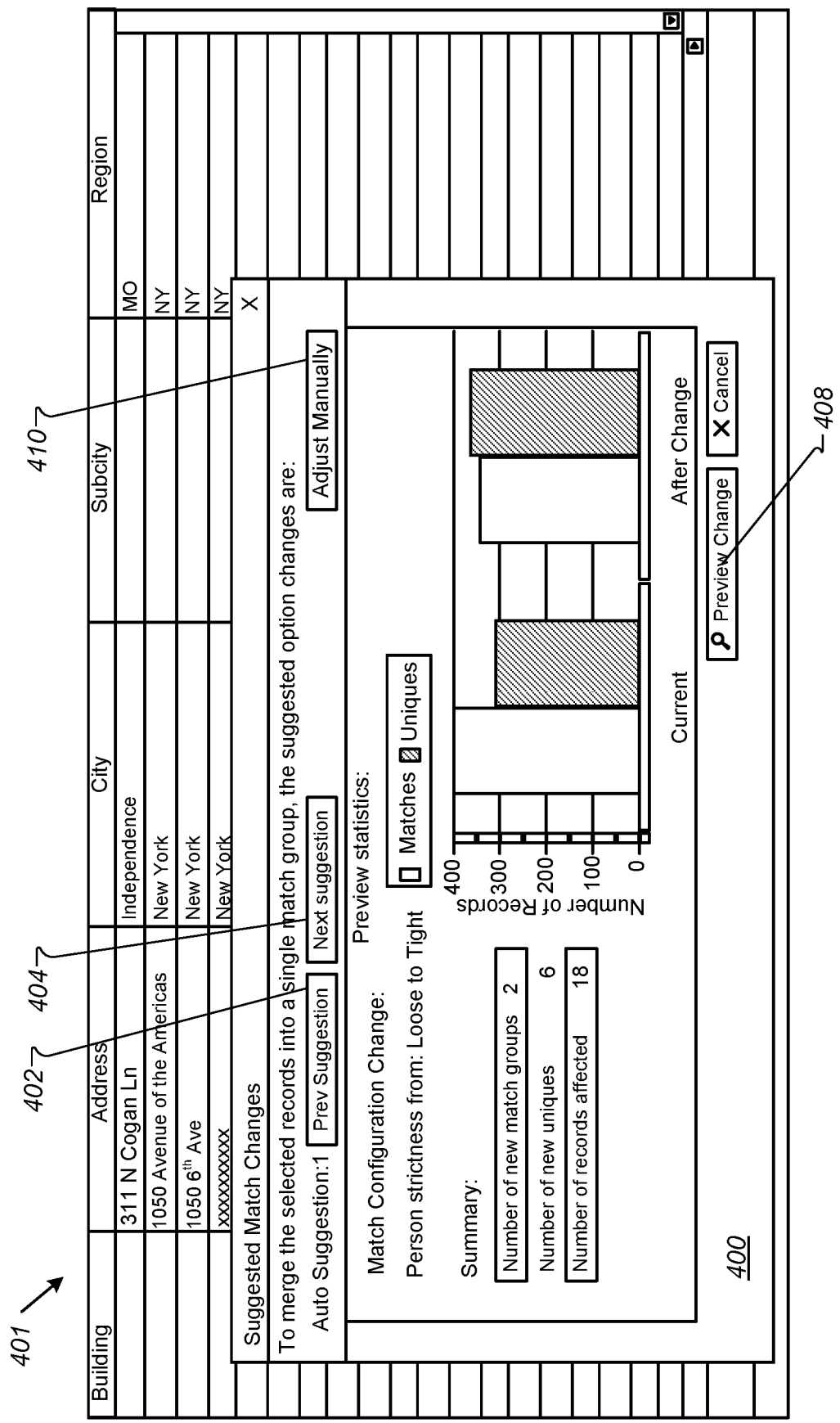
FIG. 4 is an example screenshot illustrating additional content corresponding to suggestions for modifying data match policies.

FIG. 4 is an example screenshot 400 illustrating additional content corresponding to suggestions for modifying data match policies. Data records 401 pertaining to screenshot 400 are depicted behind screenshot 400. The user may have been accessing the data records 401 and triggered display of user interface indicated by example screenshot 400. For example, the screenshot 400 may represent a data editor that may be generated in a user interface and executed by system 100. The user interface shown in screenshot 400 may be generated by server 108, and more particularly may be provided and interfaced by data cleanse advisor 114 and data match engine 116.

In this example, a number of suggestions are available for the user to review using controls 402 and 404 to move within the suggestions. The suggestions may have been provided in response to a user requesting to match or un-match particular data records in the system 100.

Preview statistics 406 are shown for a user to understand a high level view of data changes that may occur if a particular suggestion were to be executed in the system 100. A control 408 is provided to allow the user to preview functionality and specific data changes if the particular suggestion were to be executed. If the user selects control 408, a preview mode user interface can be displayed to enable the user to view a before and after component and determine whether or not to apply the suggestion change or discard the suggestion change.

A manual adjustment control 410 is provided to allow a user to manually adjust data match policy configurations (e.g., settings). Selection of control 410 may invoke a wizard to guide the user through adjusting a data match policy or to enable the user to build a new data match policy. The user may select the manual adjustment control 410 to add custom policies from a set of predefined templates that include a user case associated with the user or customer identification with respect to matching data records.

Figure 5A:
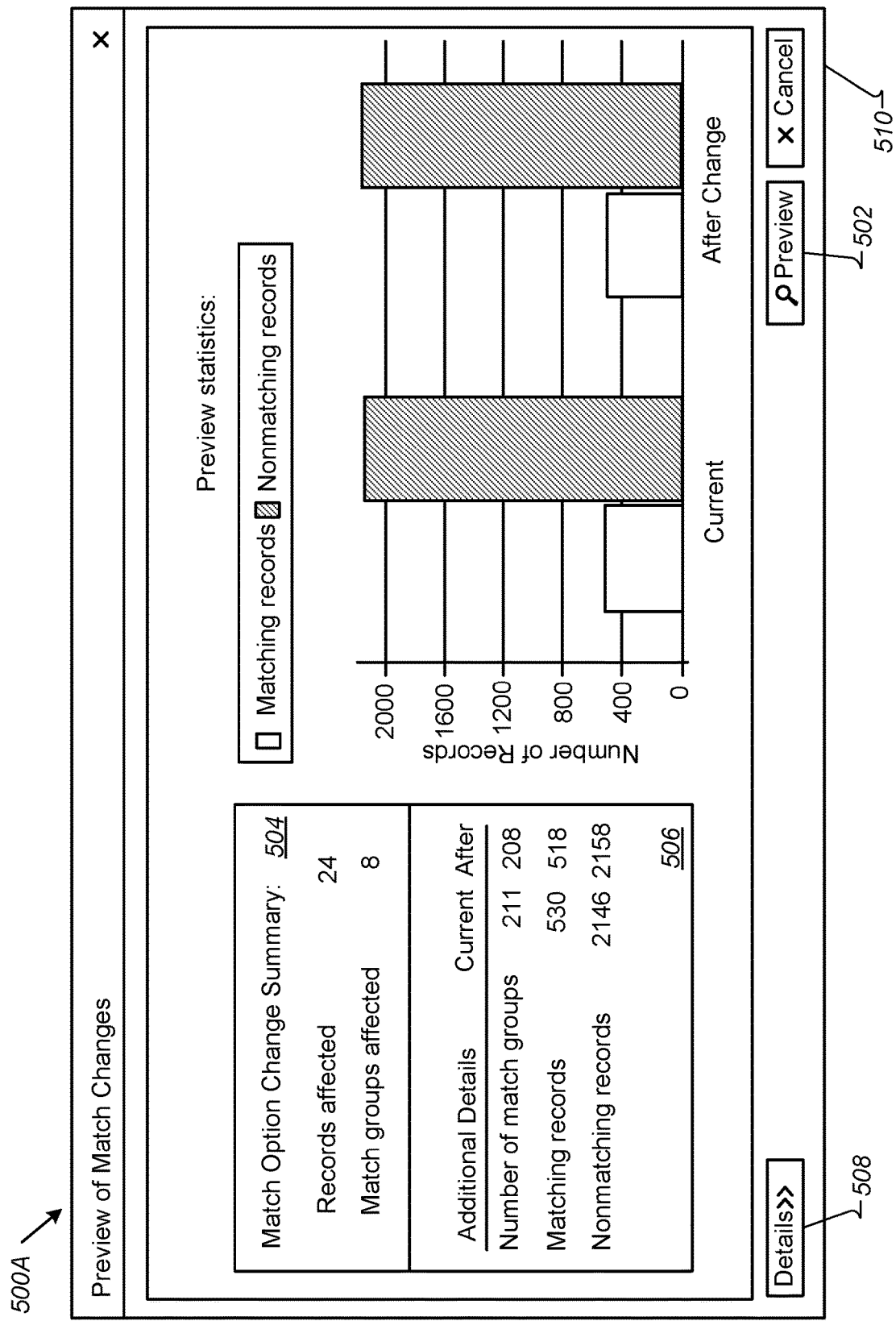
FIGS. 5A-5C illustrate example screenshots for previewing modifications to data match policies.
Figure 5B:
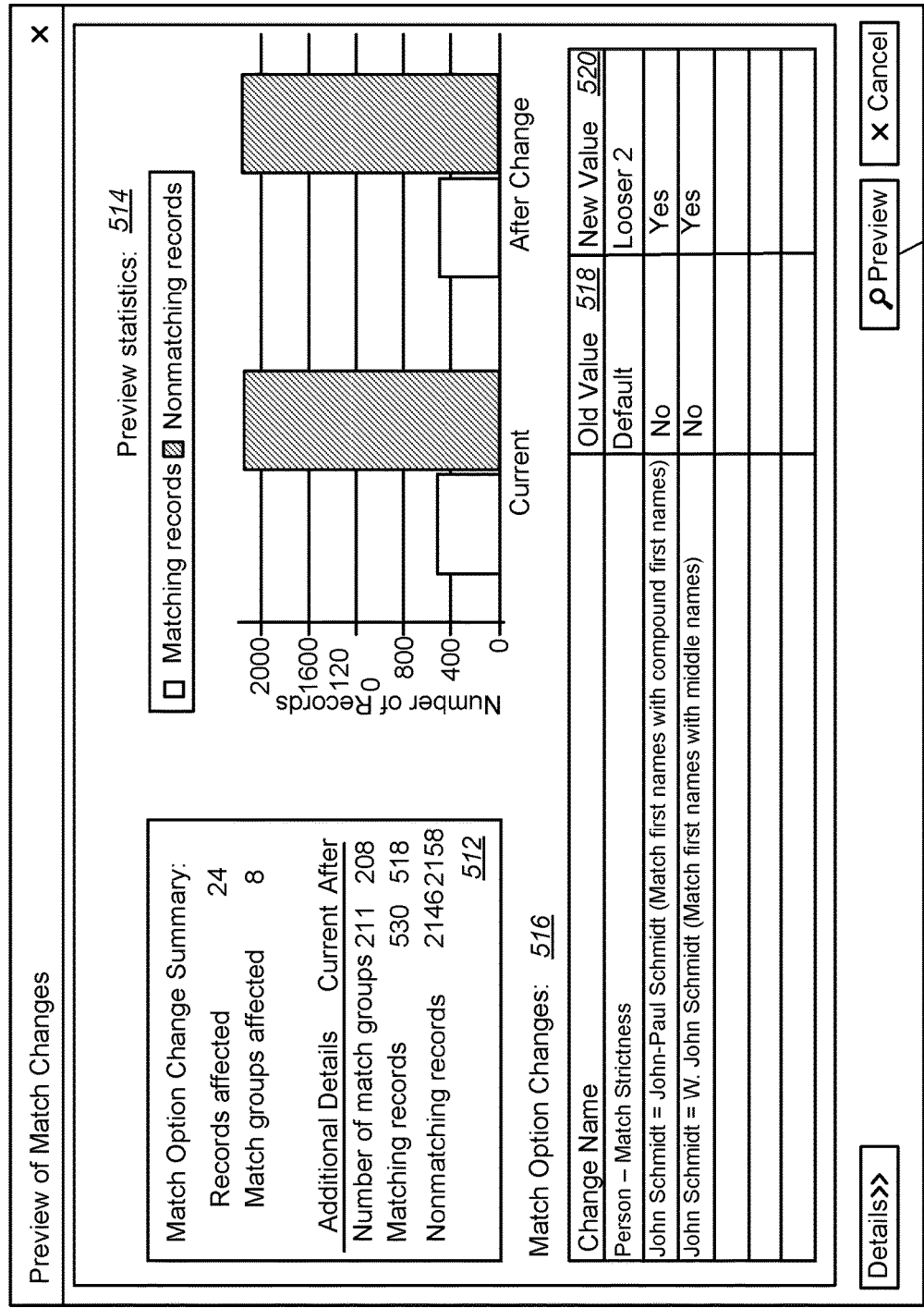
Figure 5C:
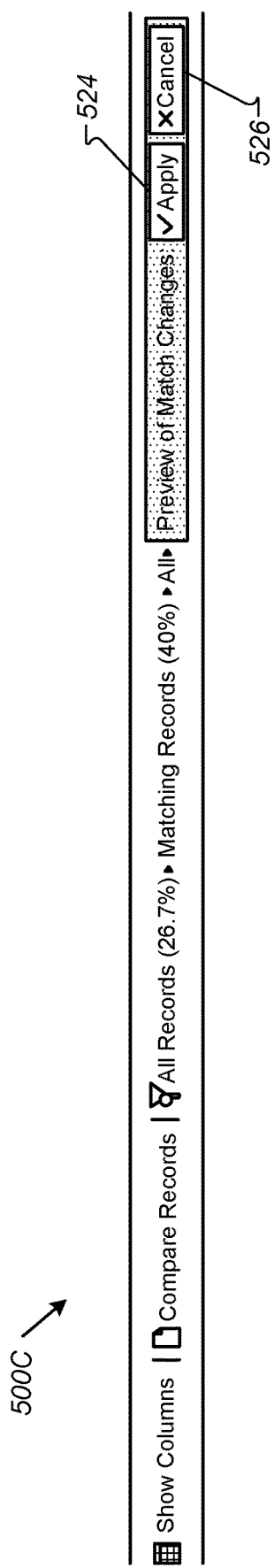

FIG. 5A-5C illustrate example screenshots 500A-500C for previewing modifications to data match policies. The preview may pertain to policy changes made using a data match editor. The editor may be generated in a user interface that is executed by system 100. The user interface shown in screenshots 500A-500C may be generated by server 108, and more particularly may be provided and interfaced by data cleanse advisor 114 and data match engine 116.

As shown in FIG. 5A, the content in user interface 500A is provided to a user in response to receiving a selection to preview suggestions of data match policy changes (e.g., selection of control 502 in any of the user interfaces described herein). In one example, the user interface 500A may include data match theme changes or multiple match suggestion (e.g., option) changes, rather than a single suggestion change, as described above.

In the depicted example interface 500A, a match option change summary 504 is shown including a number of data records affected and a number of match groups affected by a particular suggested modification to data and/or data match policies associated with the data. In addition, detailed metrics 506 about currently matching records (i.e., pre-execution of suggested changes) and after metrics (e.g., post-execution of suggested changes) are shown. The user can analyze such statistics and determine whether or not a change is drastic or damaging to the current data. To view additional data, the user can select a details control 508 to display the list of changes that were queued and sent to the data match engine 116. To return to a suggestion user interface, the user can select a cancel control 510.

As shown in FIG. 5B, a user may have viewed data records that included user names including a version of "John Schmidt." A user interface similar to interface 500A may have been provided to the user. The user may have then selected the preview control 502 to be provided interface 500B.

User interface 500B includes a summary section 512, a preview statistics section 514, and a match option change section 516. The summary section 512 depicts data record summary information and match/non-match data. The preview statistics section 514 includes graphics and data detailing before and after metrics related to a particular suggestion change.

The match option changes section 516 may include details about user-implemented selections. In the depicted example 500B, the user has loosened the strictness of a name matching policy by allowing "John Schmidt" to equate to "John-Paul Schmidt" to enable matching of first names with similar compound first names. In addition, the user has loosened the strictness of the name matching policy by allowing "John Schmidt" to equate to "W John Schmidt" to enable matching of first names with middle names. The new policy additions may be captured and stored in server 108. The stored content can be retrieved to provide reporting and features such as old value 518 and new value 520, as shown in FIG. 5B. The features may be historical data contrasted with current data. For example, the name matching policy is shown to use default strictness until the user implemented the change to loosen strictness. As such, the old value 518 is depicted as default and the new value is depicted as "Looser 2," indicating a variable that explains the rule change and a setting (e.g., 2) associated with a level of change. In this example, the user also chose to modify the name matching policy by changing the compound first name rule and the middle name rule from not implemented to implemented.

In some implementations, the user interface 500B may be displayed if the user executes a match change (e.g., data policy change) asynchronously and returns to open the underlying software application. The preview records may be displayed after the statistics are shown and upon receiving a user selection of a preview control 522.

As shown in FIG. 5C, an update is shown to the user in a match option panel 500C to reflect any accepted changes used in an updated data match policy setting. In particular, panel 500C may be provided to the user when the user selects the preview change control 408 (FIG. 4). The panel 500C may show a data grid as shown in FIG. 2, but instead of all data that is shown in FIG. 2, the panel 500C may show data that include match groups affected by a user applied change. In addition, near matches affected by the user applied change may also be shown. For example, before there was a match group of two records and a separate near matching record (FIG. 2). The user then clicked the separate record, dragged and dropped the record onto the 2-record match group. This may function to trigger the smart match tuning feature to find a way to reconfigure the match rules to make the separate record match the match group. Once completed, this preview may show a 3-record match group, as well as any other records affected by the change to match rules. The panel 500C depicts a footer to such a preview screen. The footer can indicate to the user a particular context for where the user can select an apply control 524 to accept a change to the match rules or select a cancel control 526 to reject the change.

Figure 6:
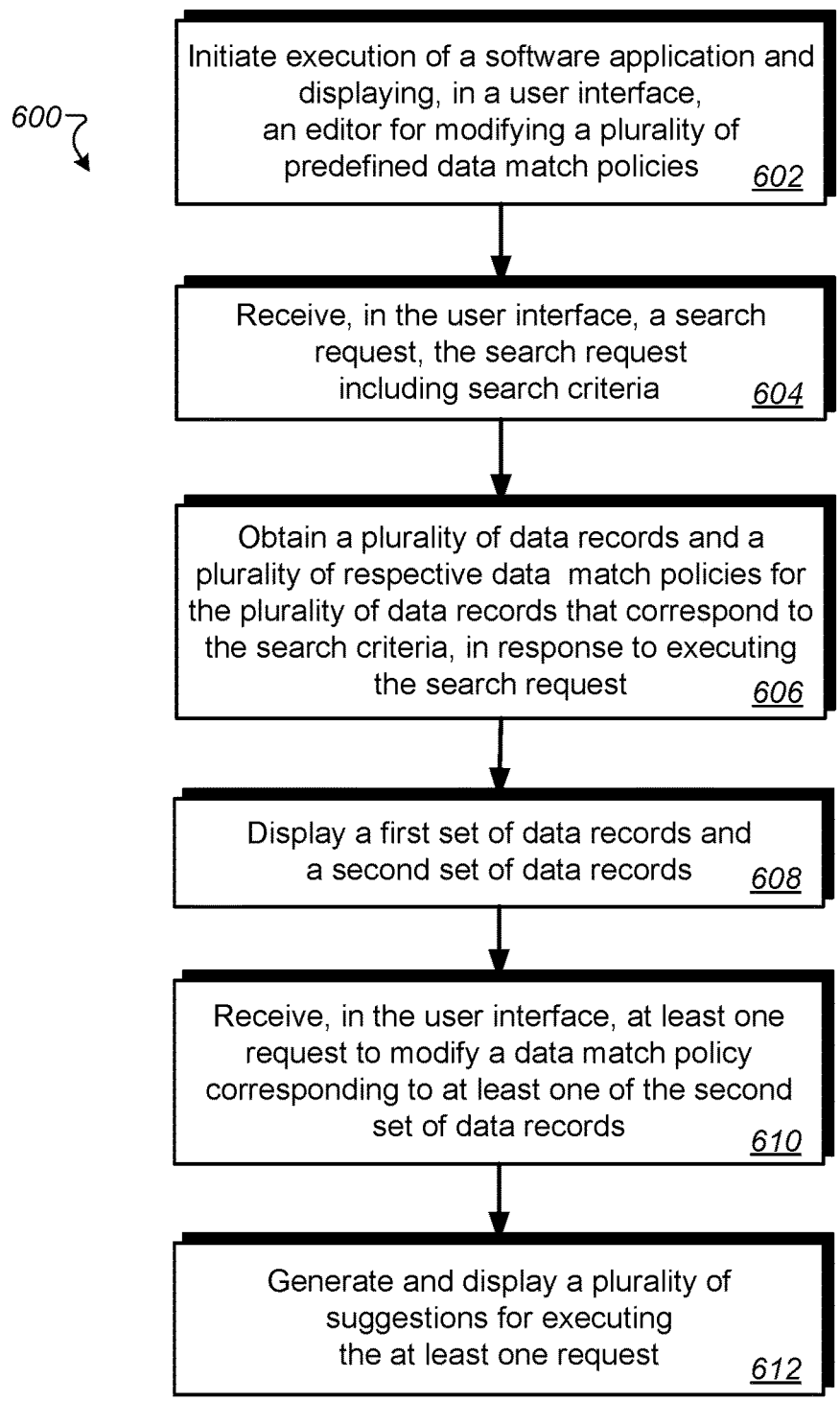
FIG. 6 is a flowchart illustrating example operations of the system of FIG. 1.

FIG. 6 is a flowchart of a process 600 illustrating example operations of the system of FIG. 1. The process 600 includes, at block 602, initiating, at a user interface, execution of a software application implementing a plurality of processes, and displaying, in the user interface, an editor for modifying a plurality of predefined data match policies. The plurality of predefined data match policies may define data properties that constitute matches to other data properties. In one example, the editor may include a number of user interface screens provided within the software application. The editor may include a small subset of options (e.g., data properties, metrics, etc.) available to modify data match policies. Instead of a full featured set of options, the editor may provide an advantage of a simplified user interface in which data changes and data policy changes can be triggered for modification based on a simple user input. Other cascading changes can be made based on the simple input because the systems and methods described herein can deduce, calculate, and/or determine additional changes that are determined to be logical for a number of data sets.

In operation, the data match engine 116 may display a user interface (e.g., 200, 300, 401, 500A-C, or other interface. A user can enter a search request by entering search criteria. At block 604, the data cleanse advisor 114 may receive, in the user interface, a search request. The search request may include the search criteria.

At block 606, the data match engine 116 may obtain a plurality of data records and a plurality of respective data match policies for the plurality of data records that correspond to the search criteria, for example, in response to executing the search request. The retrieved records and data can be provided to the user in the user interface. The data match policies may be retrieved for use as the user enters requests to modify data and policies.

At block 608, the data cleanse advisor 114 may display, in the user interface, a first set of data records and a second set of data records. The first set of data records may match the search criteria in some fashion. The second set of data records may be identified as a partial match to one or more data match policies associated with the first set of data records. The partial match may include a name, a portion of a name, an address, a portion of an address, an identification number, a workgroup, a part number, a model type, a group identifier, a data policy associated with any or all of the above, or other data describing content in an enterprise software application.

At block 610, the data cleanse advisor 114 may receive, in the user interface, at least one request to modify a data match policy corresponding to at least one of the second set of data records. The request may be based on the first set of data records. For example, the request may pertain to the user request to match a selected record in the second set of data records to the first set of data records. In particular, if the user is inspecting records between data sets and assesses that one or more record should be in a set of other similar data records, the user can indicate in a request (e.g., by dragging a record, selecting a record, or otherwise indicating the movement of the record from one place to another) to trigger the system 100 (e.g., data match engine 116) to perform analysis and provide options for adding the record to the other similar data records. Some of the analysis may be based on the other set of data records and data match policies associated with the other set of data records. In some implementations, the analysis may include assessing data match policies associated with the one record in order to match the one record to the other records. In general, the user may access the user interface to make such requests to have the data match engine 116 in combination with the suggestion engine 124 and data match policies 118 can generate and display a number of suggestions that indicate how to group the one record into the other records, as shown in block 612. The suggestions may provide logic for executing the user request. In some implementations, each suggestion corresponds to a display of statistics, graphical data, data impact analysis, and summary data associated with the request.

In some implementations, the suggestions are provided in ranked order based at least in part on a calculated impact of executing the at least one request and policy violation metrics associated with executing the at least one request.

For example, the data match engine 116 can use side-effect data to determine how data changes between data sets can impact other data sets in the system 100. In one example, the suggestions may be ranked by degree of extremeness and penalties in the order of least extreme to most extreme. For example, each suggestion is presented to the user one at a time, together with statistics that show scenarios of data impact if the particular suggestion were to be accepted by the user and executed.

In some implementations, the process 600 may also include generating and displaying a summary of a plurality of data changes that occur upon executing the plurality of suggestions associated with the at least one request. The summary may be actual data, summarized data, or other data changes. In some implementations, summary data may include a listing of the plurality of suggestions ranked according to a degree of extremeness with respect to system changes and data changes.

In operation, the process 600 may also include receiving, from a user in the user interface, a selection of at least one of the plurality of suggestions. The selection may indicate that the user wishes to carry out her initial request using the selected suggestion. The data match engine 116 can execute the selected suggestion by carrying out the request with rules, data, and steps noted in the suggestion, for example. In some examples, multiple suggestions may be selected and executed at the request of the user. Upon execution of a suggestion, the data cleanse advisor 114 can update a data match policy associated with particular modified data records.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In general, the systems described herein may be configured to execute in a multi-layer architecture including, but not limited to a user interface layer, a services layer, a business object layer, and an application server. Data associated with one or more operational parameters may be collected from each of at least two of the layers of the computing system. Additionally, user-generated input may be received which is operable to initiate a generation of a message associated with cleansing or modifying address data on a standalone server or client, or in the cloud.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for causing at least one processor to execute instructions recorded on a computer-readable medium, the method comprising:

initiating, at a user interface, execution of a software application implementing a plurality of processes, and displaying, in the user interface, an editor for modifying a plurality of predefined data match policies;

receiving, in the user interface, a search request, the search request including search criteria;

obtaining a plurality of data records and a plurality of respective data match policies for the plurality of data records that correspond to the search criteria, in response to executing the search request;

displaying, in the user interface, and from the plurality of data records, a first set of data records and a second set of data records, the first set of data records matching the search criteria and the second set of data records being identified as a partial match to one or more data match policies associated with the first set of data records;

receiving, in the user interface, at least one request to modify a data match policy corresponding to at least one of the second set of data records, the request being based on the first set of data records, the modification of the data match policy corresponding to at least one of the second set of data records is based at least on one or more data match policies used in execution of one or more previous search requests and includes a change in a level of matching strictness based at least on one or more data match policies used in execution of one or more previous search requests, the change in the level of matching strictness being performed by incrementally adjusting a degree of extremeness of the data match policy by a least amount possible, and repeatedly executing, using each incrementally adjusted data match policy, the search request until a desired result of the search request is obtained, wherein the desired result of the search request includes a plurality of suggestions for executing the search request and is being characterized by at least one of a degree of extremeness and one or more penalties being indicative of at least one of one or more positive differences and one or more negative differences in modifying the data match policy; and generating and displaying, in the user interface, the plurality of suggestions for executing the at least one request.

2. The method of claim 1, further comprising, generating and displaying a summary of a plurality of data changes that occur upon executing the plurality of suggestions associated with the at least one request, the data changes including a list of the plurality of suggestions ranked according to a degree of extremeness.

3. The method of claim 1, wherein the plurality of predefined data match policies define data properties that constitute matches to other data properties.

4. The method of claim 1, wherein the plurality of suggestions are provided in ranked order based at least in part on a calculated impact of executing the at least one request and policy violation metrics associated with executing the at least one request.

5. The method of claim 1, further comprising:
receiving a selection of at least one of the plurality of suggestions;
executing the selected suggestion; and
updating a data match policy associated with the at least one data record in the second set of data records.

6. The method of claim 1, wherein each suggestion corresponds to a display of statistics, graphical data, data impact analysis, and summary data associated with the request.

7. The method of claim 1, further comprising:
receiving, from a software application executing on a client computing device, an additional service request to modify a data match policy corresponding to at least one of the second set of data records;
determining a goal associated with the additional service request; and
generating and displaying, in the user interface, a plurality of suggestions for carrying out the at least one request according to the goal.

8. The method of claim 7, wherein the goal includes matching at least one property of the first set of data records to at least one property of the second set of data records or un-matching at least one property of the first set of data records with at least one property of the second set of data records.

9. A system for modifying a plurality of predefined data match policies, the system comprising:
at least one memory including instructions on a computing device; and
at least one processor on the computing device, wherein the processor is operably coupled to the at least one memory and is arranged and configured to execute the instructions that, when executed, cause the processor to implement:
initiating, at a user interface, execution of a software application implementing a plurality of processes, and displaying, in the user interface, an editor for modifying a plurality of predefined data match policies;
receiving, in the user interface, a search request, the search request including search criteria;
obtaining a plurality of data records and a plurality of respective data match policies for the plurality of data records that correspond to the search criteria, in response to executing the search request;
displaying, in the user interface, and from the plurality of data records, a first set of data records and a second set of data records, the first set of data records matching the search criteria and the second set of data records being identified as a partial match to one or more data match policies associated with the first set of data records;
receiving, in the user interface, at least one request to modify a data match policy corresponding to at least one of the second set of data records, the request being based on the first set of data records, the modification of the data match policy corresponding to at least one of the second set of data records is based at least on one or more data match policies used in execution of one or more previous search requests and includes a change in a level of matching strictness based at least on one or more data match policies used in execution of one or more previous search requests, the change in the level of matching strictness being performed by
incrementally adjusting a degree of extremeness of the data match policy by a least amount possible, and
repeatedly executing, using each incrementally adjusted data match policy, the search request until a desired result of the search request is obtained, wherein the desired result of the search request includes a plurality of suggestions for executing the search request and is being characterized by at least one of a degree of extremeness and one or more penalties being indicative of at least one of one or more positive differences and one or more negative differences in modifying the data match policy; and
generating and displaying, in the user interface, the plurality of suggestions for executing the at least one request.

10. The system of claim 9, further comprising, generating and displaying a summary of a plurality of data changes that occur upon executing the plurality of suggestions associated with the at least one request, the data changes including a list of the plurality of suggestions ranked according to a degree of extremeness.

11. The system of claim 9, wherein the plurality of suggestions are provided in ranked order based at least in part on a calculated impact of executing the at least one request and policy violation metrics associated with executing the at least one request.

12. The system of claim 9, further comprising:
receiving a selection of at least one of the plurality of suggestions;
executing the selected suggestion; and
updating a data match policy associated with the at least one data record in the second set of data records.

13. The system of claim 9, wherein each suggestion corresponds to a display of statistics, graphical data, data impact analysis, and summary data associated with the request.

14. The system of claim 9, further comprising:
receiving, from a software application executing on a client computing device, an additional service request to modify a data match policy corresponding to at least one of the second set of data records;
determining a goal associated with the additional service request; and
generating and displaying, in the user interface, a plurality of suggestions for carrying out the at least one request according to the goal.

15. The system of claim 14, wherein the goal includes matching at least one property of the first set of data records to at least one property of the second set of data records or un-matching at least one property of the first set of data records with at least one property of the second set of data records.

16. A computer program product for modifying a plurality of predefined data match policies, the computer program product being tangibly embodied on a non-transitory computer-readable storage medium and comprising instructions that, when executed, are configured to cause at least one computing device to:
initiate, at a user interface, execution of a software application implementing a plurality of processes, and displaying, in the user interface, an editor for modifying a plurality of predefined data match policies;
receive, in the user interface, a search request, the search request including search criteria;
obtain a plurality of data records and a plurality of respective data match policies for the plurality of data records that correspond to the search criteria, in response to executing the search request;
display, in the user interface, and from the plurality of data records, a first set of data records and a second set of data records, the first set of data records matching the search criteria and the second set of data records being identified as a partial match to one or more data match policies associated with the first set of data records;
receive, in the user interface, at least one request to modify a data match policy corresponding to at least one of the second set of data records, the request being based on the first set of data records, the modification of the data match policy corresponding to at least one of the second set of data records is based at least on one or more data match policies used in execution of one or more previous search requests and includes a change in a level of matching strictness based at least on one or more data match policies used in execution of one or more previous search requests, the change in the level of matching strictness being performed by
incrementally adjusting one or more parameter values of the data match policy by a least possible amount, and
repeatedly executing, using each incrementally adjusted data match policy, the search request until a desired result of the search request is obtained, wherein the desired result of the search request includes a plurality of suggestions for executing the search request and is being characterized by at least one of a degree of extremeness and one or more penalties being indicative of at least one of one or more positive differences and one or more negative differences in modifying the data match policy; and
generate and display, in the user interface, plurality of suggestions for executing the at least one request.

17. The computer program product of claim 16, further comprising, generating and displaying a summary of a plurality of data changes that occur upon executing the plurality of suggestions associated with the at least one request, the data changes including a list of the plurality of suggestions ranked according to a degree of extremeness.

18. The computer program product of claim 16, further comprising:
receiving a selection of at least one of the plurality of suggestions;
executing the selected suggestion; and
updating a data match policy associated with the at least one data record in the second set of data records.

19. The computer program product of claim 16, further comprising:
receiving, from a software application executing on a client computing device, an additional service request to modify a data match policy corresponding to at least one of the second set of data records;
determining a goal associated with the additional service request; and
generating and displaying, in the user interface, a plurality of suggestions for carrying out the at least one request according to the goal.

20. The computer program product of claim 19, wherein the goal includes matching at least one property of the first set of data records to at least one property of the second set of data records or un-matching at least one property of the first set of data records with at least one property of the second set of data records.

* * * * *